United States Patent [19]

Langford

[11] Patent Number: 4,969,320
[45] Date of Patent: Nov. 13, 1990

[54] A GRASS LEVEL CHECKER FOR A GRASS CATCHER

[75] Inventor: LeRoy Langford, LaPorte, Ind.

[73] Assignee: The Toro Company, Minneapolis, Minn.

[21] Appl. No.: 387,559

[22] Filed: Jul. 28, 1989

[51] Int. Cl.⁵ .................. A01D 34/12; A01D 34/48; A01D 34/70; B65B 1/30
[52] U.S. Cl. .................... 56/16.6; 56/199; 56/202; 141/95
[58] Field of Search ............... 56/10.2, 16.6, 199, 56/202; 141/95

[56] References Cited

U.S. PATENT DOCUMENTS

| | | | |
|---|---|---|---|
| 2,067,916 | 1/1937 | Haffner et al. | 56/199 |
| 2,517,335 | 8/1950 | Muzzy | 56/199 |
| 3,606,747 | 9/1971 | Bauman | 56/202 |
| 3,971,198 | 7/1976 | Lane | 56/202 |
| 4,158,279 | 6/1979 | Jackson | 56/202 |
| 4,379,385 | 4/1983 | Reinhall | 56/16.6 |
| 4,532,755 | 8/1985 | Schemelin et al. | 56/16.6 |
| 4,589,249 | 5/1986 | Walker et al. | 56/16.6 |
| 4,709,541 | 12/1987 | Broman et al. | 56/202 |
| 4,782,650 | 11/1988 | Walker | 56/202 |

FOREIGN PATENT DOCUMENTS 2101864   1/1983   United Kingdom ............... 56/202

Primary Examiner—Bruce M. Kisliuk
Attorney, Agent, or Firm—R. Lawrence Buckley

[57] ABSTRACT

A grass bagger (13) for a lawn tractor (14). The catcher (13) includes a hood (20) which directs grass clippings into a pair of bag assemblies (40). A grass checker (50), connected to hood (20), is used to check the level of accumulated grass beneath hood (20) to determine when it would be appropriate to empty bag assemblies (40) of their accumulated grass clippings. In order to prevent grass clippings from leaking between bag assemblies (40) and hood (20), and to keep hood (20) from popping open when lawn tractor (14) is driven over rough ground, a pair of latches (70) is included to releasably secure hood (20) to bag assemblies (40).

9 Claims, 4 Drawing Sheets

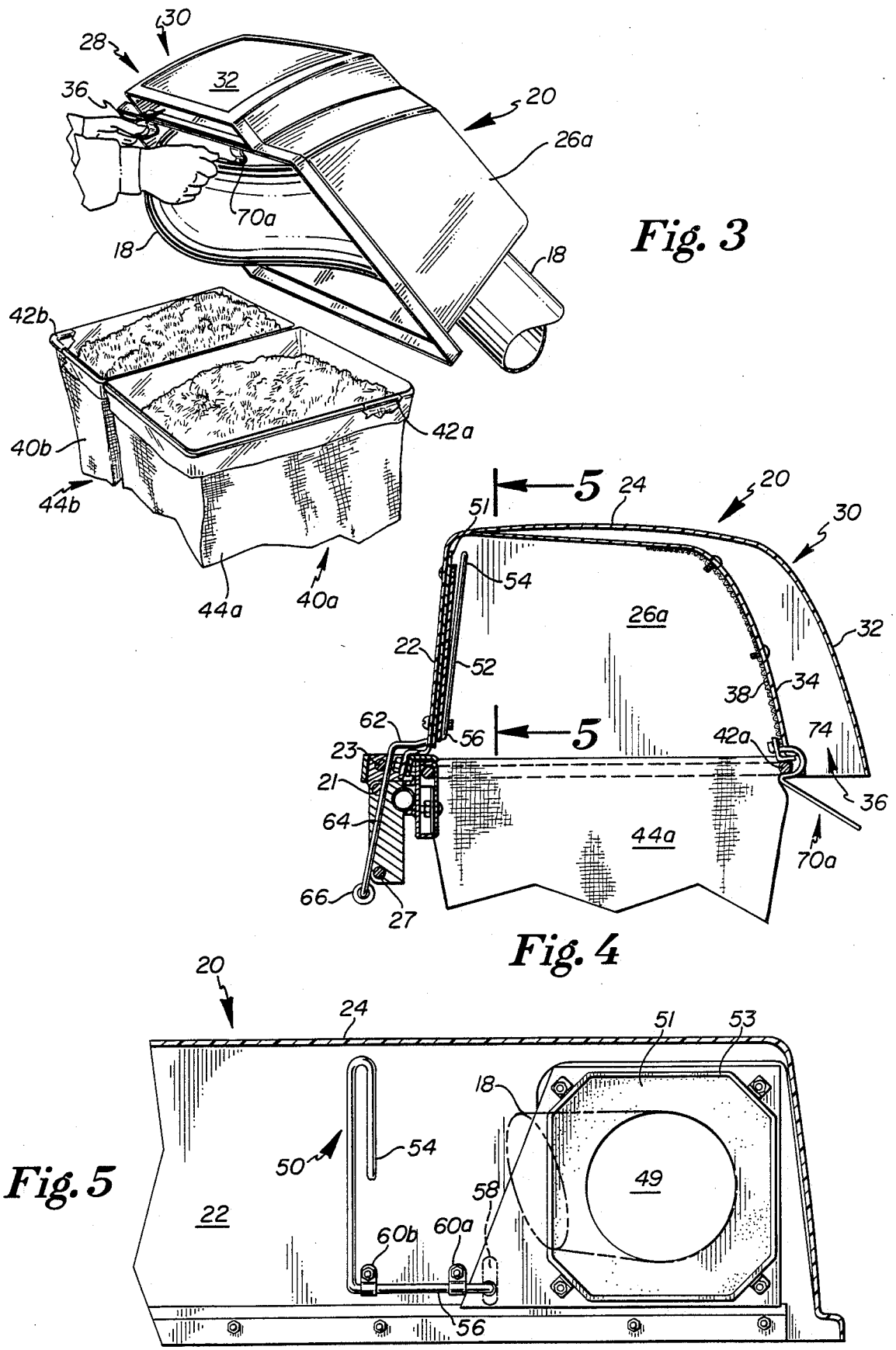

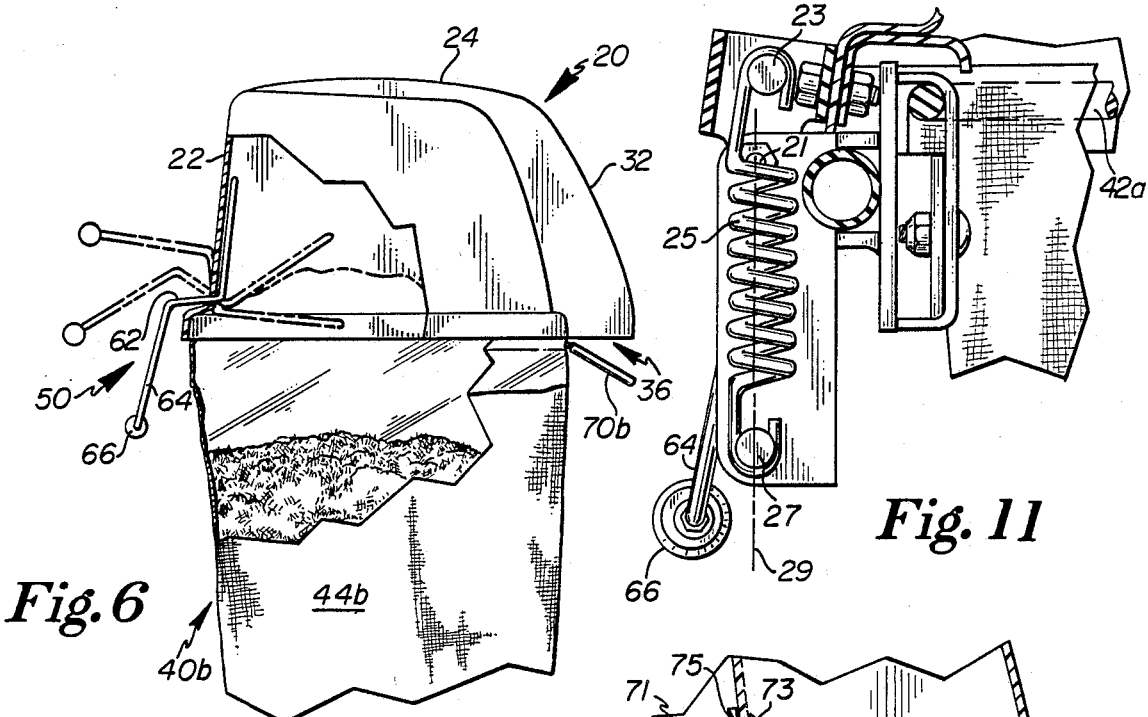
Fig. 6
Fig. 11
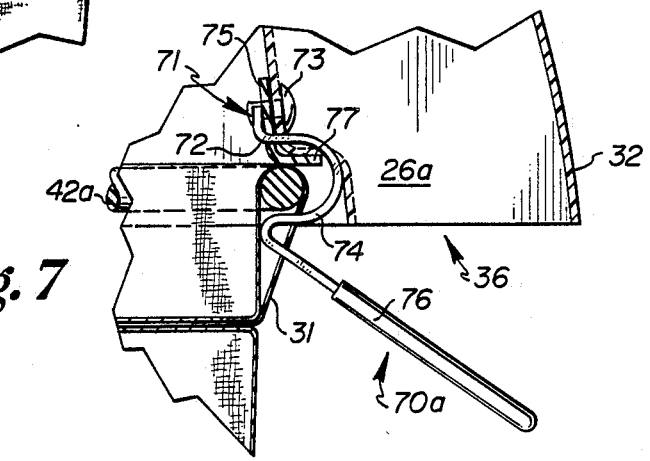
Fig. 7
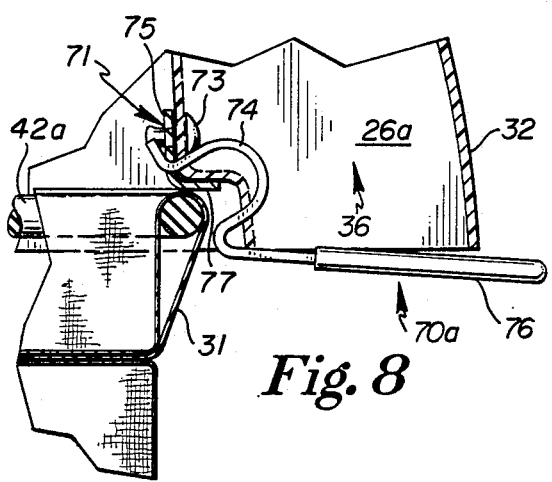
Fig. 8
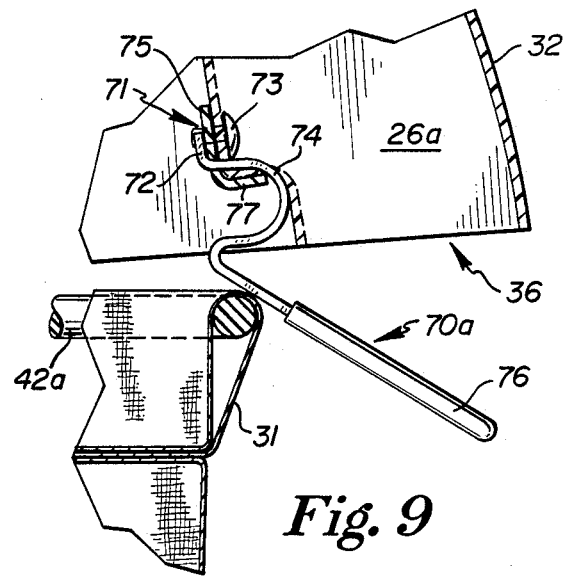
Fig. 9

A GRASS LEVEL CHECKER FOR A GRASS CATCHER

Field of the Invention

The invention pertains generally to lawn mowers and more particularly to grass catchers for same.

BACKGROUND OF THE INVENTION

As mentioned above, the invention pertains to grass catchers for lawn mowers. Although aspects of the invention could conceivably be used on many types of grass catchers, even on grass catchers for walk-behind reel mowers, the preferred catcher according to the invention is used in conjunction with riding rotary lawn mowers or lawn tractors. The following discussion will focus almost exclusively on lawn tractors, but those skilled in the art will recognize that the invention could be applied to other types of mowers as well.

A lawn tractor includes a traction vehicle which carries a rotary grass cutting unit. The cutting unit includes a deck beneath which is a rotatable blade powered by the traction vehicle's prime mower. Attached to the mower deck is a discharge elbow which guides the grass clippings, leaves, debris, etc., into an upwardly-inclined discharge tube which terminates at its upper end in a closed hood. The hood typically covers one or more upwardly-opening flexible grass bags and serves to evenly distribute the grass, etc., between the bags. The flexible bags are attached to and hang from square or rectangular frames which are cantilevered from the back end of the lawn tractor. Although aspects of the invention could be applied to other types of grass catchers, for the sake of brevity the following discussion will focus on the "flexible bag" catcher described immediately above.

Although prior "flexible bag" grass catchers are generally adequate for their intended purposes, they are hindered by at least three problems which have heretofore been inadequately addressed. One longstanding problem with such catchers is that it has always been very difficult to conveniently determine, during operation of the lawn tractor, when the bags are full and in need of emptying. Secondly, as the bags fill a gap tends to develop between the tops of the bags and the bottom of the hood, leading to grass "leakage" through the gap. Finally, the hoods, which are oftentimes mounted using an overcenter spring-loaded hinge scheme, are susceptible to popping open when the mower is driven over rough ground.

With regard to the difficulty of determining when the catcher is full, several techniques have been tried. probably the most common type of "fill detector" is a transparent window in the hood or in the discharge tube. With a window in the hood, at least theoretically the operator can occasionally look directly into the grass bags to determine their status. With a window in the discharge tube the operator can theoretically directly observe whether the grass clippings are flowing upwardly and rearwardly into the grass catcher at the normal rate. Windows of this type possess several inadequacies, however. For one thing, clipping monitoring windows tend to reflect light. Depending on the angle of the sun relative to the window, the glare can make it difficult for the operator to observe what is happening inside the hood or discharge tube. Even more of a problem is the fact that clipping monitoring windows tend to become stained and dirty after a short period of time thus making them more opaque than transparent. Finally, the operator must actually divert his or her attention from operating the mower to peer in the clipping monitoring window.

The second common type of "fill detector" is based on an air flow or pressure phenomenon. Reference is made to U.S. Pat. No. 3,971,198, for example, which shows an air flow detector built into the hood of a walk-behind rotary mower grass catcher. When the detector is spinning the air flow is adequate and the bags are capable of receiving additional grass, leaves, etc. However, when the detector stops spinning, this indicates to the operator that it is time to empty or dispose of the grass bags. A similar system involves, in effect, monitoring the air pressure within the discharge tube, hood, etc. Reference is made to U.S. Pat. No. 4,589,249. When the back pressure becomes excessively high, a horn or beeper can sound to signal the operator that the bags need emptying or changing. A visual indicator such as a red light could also be used to signal this state of affairs. As in the case of the window-type fill detectors discussed above, the operator usually must at least for a short time divert his or her attention from operating the mower to visually scan the air flow or air pressure type fill detector. An audible signal is possible, as disclosed in U.S. Pat. No. 4,589,249, but such a signal would have to be extremely loud to be heard over the noise of a lawn tractor, and would be unnecessarily expensive as well.

As noted above, another problem with pre-existing grass catchers is grass leakage between the hood and the grass bags. The cause of the problem is clear: the grass catcher hood and the bag frames are usually independently connected to the traction vehicle, so that when the bags are even partially filled with damp, lush grass, they naturally tend to sag downwardly. What's worse is that the bags usually fill at different rates and sag at different rates, so that even if the hood is spring loaded to keep it in contact with the bag frames, the hood would only engage the lightest bag, i.e, the one which has sagged the least. This results in a gap between the bag (or bag frame) which has sagged the most and the bottom edge of the hood. Such a gap can obviously allow grass clippings to escape.

As noted above, some hoods are spring-loaded in an attempt to minimize the gap between the hood and the grass bags. Such a technique can actually exacerbate the hood popping open problem also discussed above. The typical spring-loading mechanism applies a downward force to the hood when the hood is in its "full down" position but once the hood is separated from the bag frames by a short distance the spring goes overcenter and actually assists in lifting the hood off of the bag frames. Applicant has observed that hoods can pop open as lawn tractors are driven over fairly rough terrain, presumably because the hood springs have gone overcenter.

U.S. Pat. No. 4,637,202, assigned to The Toro Company, discloses one technique for addressing the "gap" and hood popping problems outlined above. Each grass bag is suspended from a bag frame which includes a pair of substantially parallel rearwardly-pointing hand grip elements. The hand grip elements can be squeezed toward one another and fit into a mating bracket attached to the catcher hood. While this securely mates the bag frames to the hood, the system is somewhat costly and also the hood cannot simply be slammed shut; the operator must instead take the time to manipulate the hand grip elements so as to secure the bag frames to the hood.

The present invention addresses the problems discussed above with prior art grass catchers, i.e., detecting full bags, stopping "hood popping," and preventing grass leakage between the hood and the grass bags. The invention is summarized below and discussed in some detail with reference to the appended Drawing.

SUMMARY OF THE INVENTION

Accordingly, one aspect of the invention is directed to a grass checker for determining the level of accumulated grass within a grass catcher. The grass checker includes a handle portion located outside the grass catcher accessible by an operator; a grass contacting portion connected to the handle portion and located inside the grass catcher; and means for operatively disposing the grass checker relative to the grass catcher, wherein to check the level of accumulated grass in the grass catcher the operator manipulates the handle portion to move the grass contacting portion toward the accumulated grass, and wherein when grass is contacted the operator will encounter increased resistance to movement, whereby the operator can determine based on the position of the handle portion and the degree of increased resistance the level of accumulated grass within the grass catcher.

A preferred grass checker is pivotably connected to the grass catcher such that when the handle portion is raised by the operator the grass contacting portion lowers within the grass catcher to contact the top of the pile of accumulated grass.

A second aspect of the invention is a grass catcher including a grass bag assembly having a bag frame; a pivoting hood having a down position and an up position; and a latch having first and second positions for releasably securing the hood in its down position. When the latch is in its first position it can secure the hood to the bag frame and when the latch is in its second position it can either receive or release the bag frame. The latch includes an upper portion pivotably connected to the hood, a middle portion for receiving the bag frame when the hood is in its down position and the latch is in its first position, and an inclined lower portion for engaging the bag frame to automatically pivot the latch from its first position to its second position to allow the latch to engage the bag frame as the hood is being lowered from its up position to its down position.

Further aspects of the invention are shown and described with reference to the appended Drawing, described below.

BRIEF DESCRIPTION OF THE DRAWING

The invention will be further described with reference to the Drawing, wherein:

FIG. 3 is a partial right rear perspective view of the grass catcher shown in FIG. 1, with the hood in its raised position;

FIG. 4 is a sectional view of the grass catcher shown in FIG. 2 taken substantially along line 4-4 thereof;

FIG. 5 is a sectional view of the right hand portion of the grass catcher hood shown in FIG. 1, taken generally along line 5-5 of FIG. 4;

FIG. 6 is a left side elevational view of the grass catcher shown in FIG. 1, with the hood partially broken away, showing the grass checker in three positions;

FIG. 7 is a side elevational view of one of the hood latches of the catcher of FIG. 1 secured about the corresponding bag frame;

FIG. 8 shows the hood latch of FIG. 7 having been manipulated to release the corresponding bag frame;

FIG. 9 shows the hood latch of FIG. 7 in its released state, i.e., not engaging the corresponding bag frame;

FIG. 11 is a side elevational view of the hinge assembly for the hood shown in FIG. 1.

DETAILED DESCRIPTION OF PREFERRED EMBODIMENT

Figure 1:
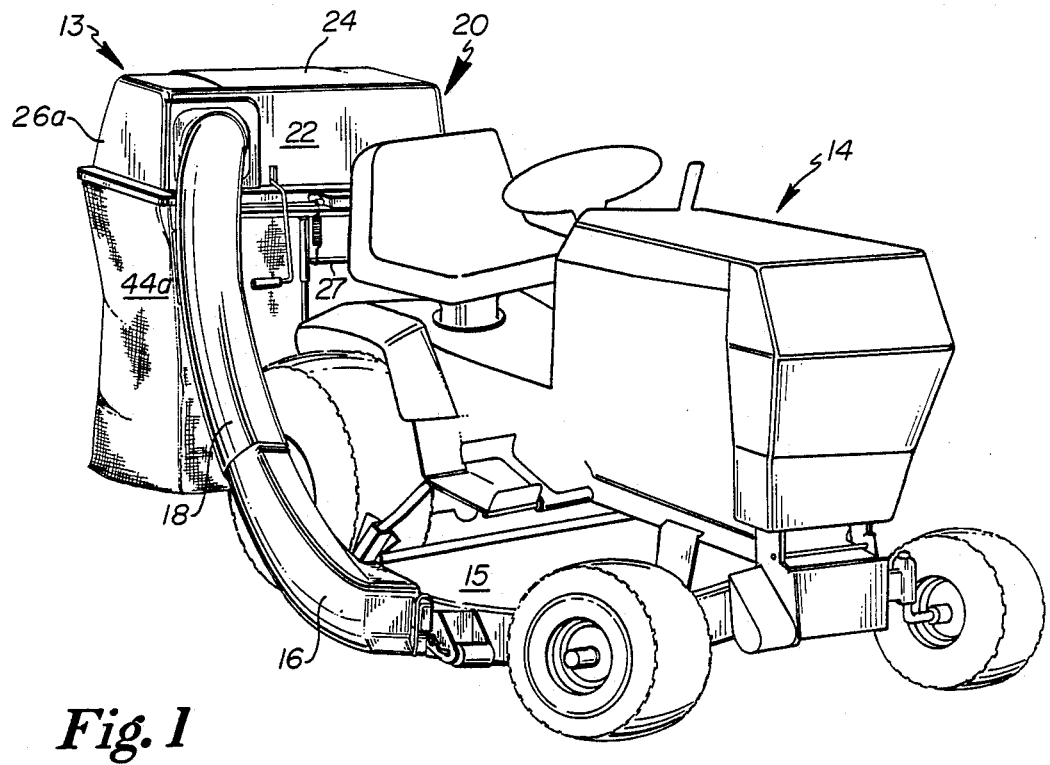
FIG. 1 is a front and right side perspective view of a grass catcher according to the invention mounted on a lawn tractor.
Figure 2:
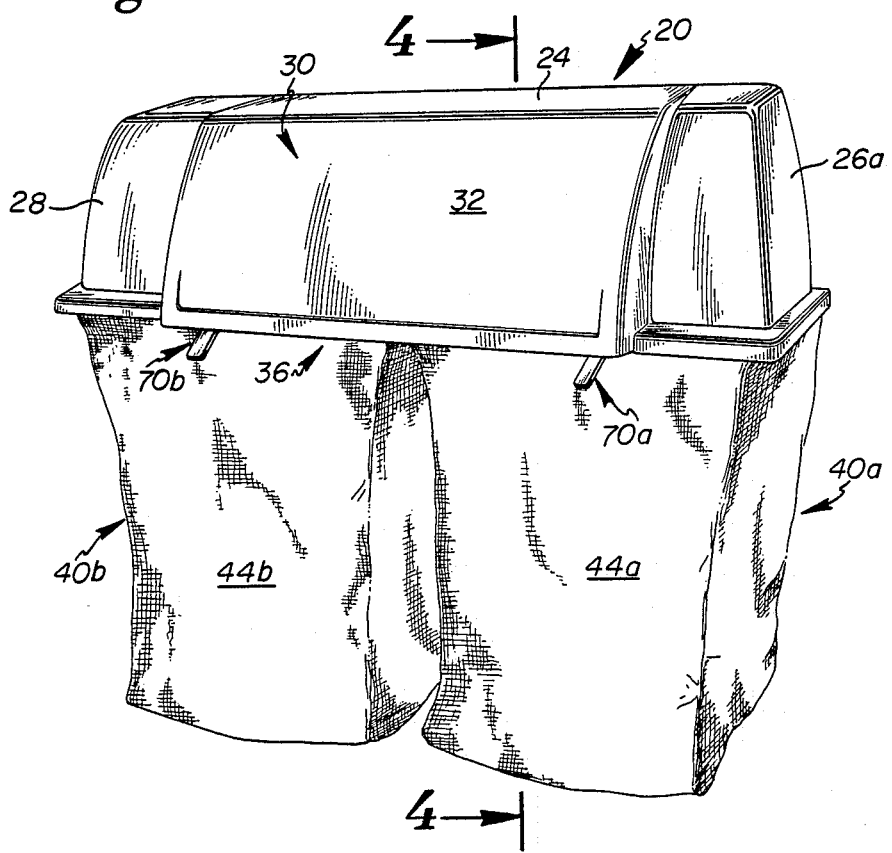
FIG. 2 is a right rear perspective view of the grass catcher shown in FIG. 1.

With reference to the Drawing, wherein like reference numerals designate like parts and assemblies throughout the several views, FIG. 1 shows a preferred grass catcher 13 according to the invention attached to a lawn tractor 14. Lawn tractor 14 may be powered by an internal combustion engine or other means. The powering means drives a rotary cutting element (not shown) which is enclosed within and beneath a deck 15. The cutting element may be a conventional rigid blade or a monofilament line for severing the grass. A flow of air is required for proper cutting as well as for transport of the clippings into the catcher 13. The air flow also provides a vacuuming action which is used advantageously to vacuum up leaves and the like. Typically, a rigid blade is equipped with an integral sail to generate air flow, while an auxiliary sail or fan may be used with a monofilament type mower. In any case, the air flow generated conveys the clippings or leaves from within deck 15, into a discharge elbow 16 which rearwardly and upwardly carries the clippings or leaves into a discharge tube 18 which in turn terminates at its upper end within a hood 20, the uppermost component of grass catcher 13.

Broadly speaking, hood 20 is in the nature of a large inverted shoe box, a parallelepiped minus the bottom face. That is, hood 20 includes a substantially vertical and rectangular front wall 22; a substantially horizontal top 24; right and left substantially vertical side walls 26a and 26b, respectively; a rear wall 28; and an open substantially rectangular and horizontal bottom opening, the periphery of which consists of the lower horizontal edges of walls 22, 26 and 28. Rear wall 28 includes a central bulge 30, extending across about two-thirds of the rear wall 28 and centered thereon, formed by an outer surface 32 and an inner surface 34. Surfaces 32 and 34 are spaced apart one from the other and combine to form a vent 36 which is open at the bottom, adjacent the lower periphery of hood 20. Inner surface 34 carries a screen 38 which allows the air issuing from the discharge tube 18 to escape into vent 36 and eventually into the atmosphere, minus the grass clippings, leaves, etc.

Figure 10:
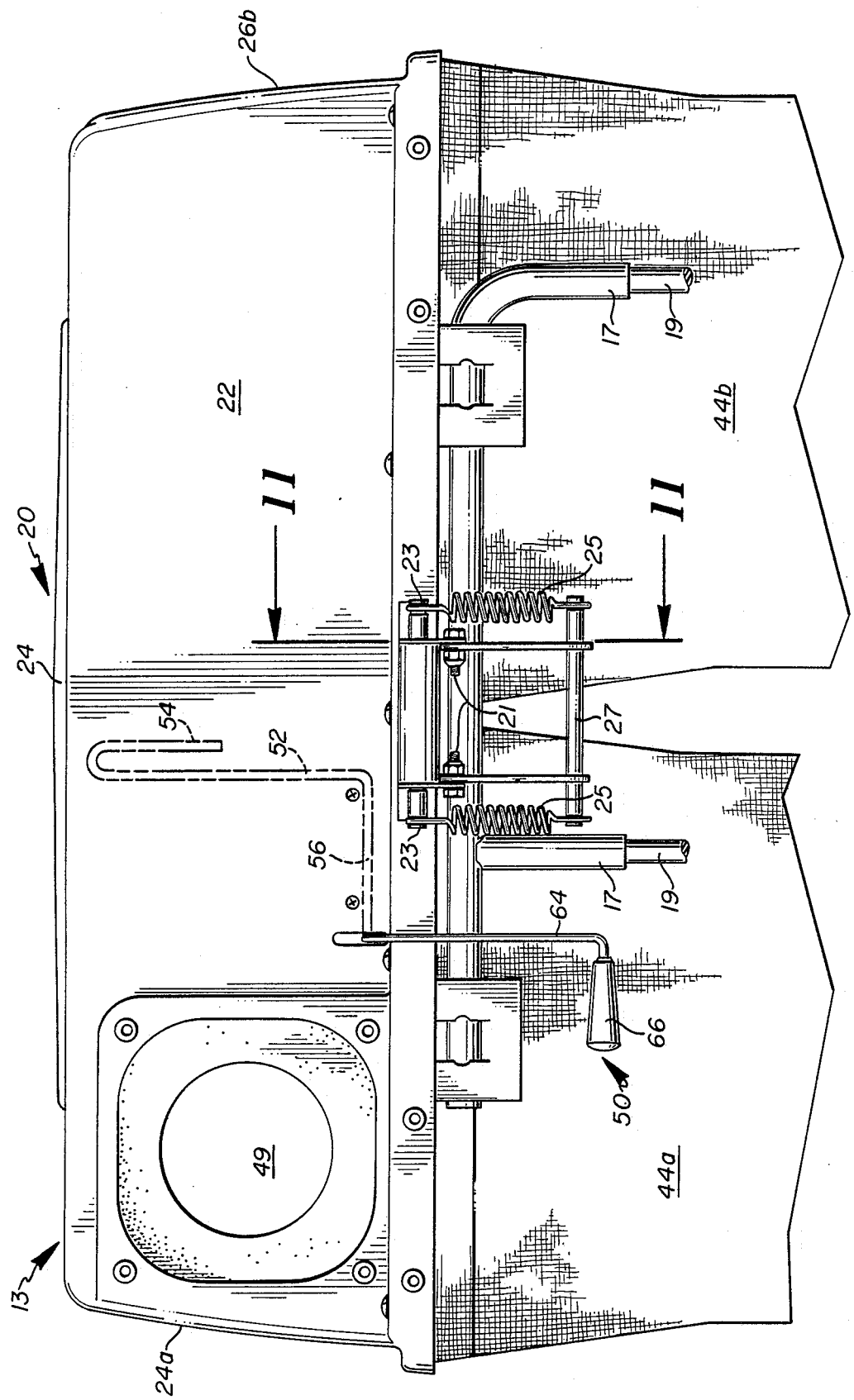
FIG. 10 is a front elevational view of the grass catcher of FIG. 1.

Hood 20, at the lower edge of the front wall 22, is hingedly mounted to the frame of lawn tractor 14 so that it can be pivoted upwardly as shown in FIG. 3 to allow access to right and left bag assemblies 40a and 40b suspended therebeneath. Referring to FIG. 10, hood 20 pivots about bolts 21 which are fixed to a two-legged catcher frame 17 which in turn is slidably received and supported by a pair of standards 19 connected to the frame of tractor 14. More specifically, stub shafts 23, fixed to hood 20, pivot about a line passing through bolts 21. A pair of laterally spaced extension springs 25 extend between the outer ends of a rod 27 fixed to the tractor frame and stub shafts 23. When hood 20 is closed, springs 25 are in their most elongated, most stressed state, and due to the fact that stub shafts 23 are rearward of an imaginary line 29 (see FIG. 11) passing through the centers of rod 27 and bolts 21, there is a clockwise or downward force exerted by springs 25 on hood 20. As hood 20 is raised, it goes "overcenter" when shafts 23 pivot just forward (left in FIG. 11) of the imaginary line 29 passing through bolts 21 and rod 27. At this point springs 25 exert a counterclockwise or lifting force on hood 20. Since only a few degrees of counterclockwise rotation of hood 20 are required to allow it to go overcenter, latches (discussed below) are included to affirmatively hold hood 20 in its closed position, as further discussed below.

Bag assemblies 40a and 40b include a pair of substantially square bag frames 42a and 42b, respectively, connected in cantilever fashion to the frame of lawn tractor 14 at their forward edges. Grass bags 44a and 44b are suspended from frames 42a and 42b. respectively. Bags 44 are preferably a loosely woven polyester, conforming to applicable governmental specifications, strong enough to contain sharp materials, such as nails, pieces of wire, glass, etc., that may be picked up and thrown by the cutting element. Grass bags 44 may be of any size or shape compatible with hood 20 and frames 42, but a generally square bag, large enough to hold a standard 30 gallon disposable plastic bag is preferred. Bags 44 are affixed to frames 42 by folding a portion of the material of bags 44 around frames 42 and sewing a hem to create sleeves 31 (see FIGS. 7-9) which enclose frames 42 and thereby secure the bags to the frames. A single larger bag suitable for leaf bagging could be used in lieu of the two bags shown in the Drawing and described above. Also, grass catcher 13 could be a more or less rigid grass catcher such as that shown in U.S. Pat. No. 4,015,406.

Referring primarily to FIG. 5, hood front wall 22 pivotally supports a grass checker 50 which is made of a formed steel rod. Grass checker 50 includes a first elongate portion 52 which is substantially vertically disposed in its idle state (shown in FIGS. 4 and 5). First elongate portion 52 terminates at its upper end in a U-shaped loop 54 and at its lower end in a horizontal transverse portion 56 which is immediately adjacent to front wall 22 and parallel to the lower edge thereof. Still referring to FIG. 5, first elongate portion 52 is attached to the left end of horizontal portion 56, and the right end of horizontal portion 56 extends forwardly through a vertical slot 58 formed in the front surface 22 of hood 20. Clips 60a and 60b, or other suitable means, connect grass checker 50 to hood 20 in such a fashion that grass checker 50 can freely pivot relative thereto, about an axis passing lengthwise through horizontal portion 56.

Referring primarily to FIG. 4, extending forwardly from horizontal transverse portion 56 of grass checker 50 and substantially perpendicular thereto is a relatively short horizontal longitudinal portion 62. The term "longitudinal" is used to distinguish portion 62 from horizontal "transverse" portion 56. Short portion 62 is roughly perpendicular to front wall 22 when checker 50 is in its idle state or resting position, shown in FIGS. 4 and 5.

At the forwardmost end of short horizontal portion 62 is a second elongate and substantially vertical portion 64 which in turn terminates at its lower end with a horizontal handle 66. Handle 66 is preferably made of plastic and can freely rotate about the formed metal rod which constitutes the main framework of grass checker 50. Because second elongate portion 64 and handle 66 are heavier than first elongate portion 52 and loop 54, and because these components are positioned forwardly of the pivot point of checker 50 (an axis passing lengthwise through transverse horizontal portion 56), the balance of grass checker 50 is such that it normally assumes the more or less vertical position shown in FIGS. 4 and 5. This position can thus be called the idle position or resting state of checker 50.

Referring to FIG. 5, grass checker 50 is mounted to hood front wall 22 adjacent an opening 49 configured to receive discharge tube 18. Tube 18 is enclosed about its periphery by a neoprene rubber chute seal 51 held in place by a wire form seal clamp 53 which is bolted to front wall 22.

In use, the lawn tractor operator can reach behind himself or herself, grasp handle 66, and lift it to pivot grass checker 50 toward the intermediate and upper positions shown in FIG. 6. By doing so, the operator can in effect feel for the grass within bag 44a to determine whether it is time to stop the lawn tractor and empty the bags 44. Because of the design of hood 20, in conjunction with the upper end configuration of tube 18, bag 44b tends to fill up prior to bag 44a, so the status of bag 44a is a valid indicator of whether it is time to empty both bags 44. If, when the operator raises handle 66 as shown in FIG. 6, he or she feels no resistance, there is no need to empty bags 44 and mowing can continue. If, when checker 50 is manipulated as shown in FIG. 6, the grass is quite high in bag 44a, loop 54 engages the top of the grass pile. This causes two things to happen, namely: (i) it makes it progressively more difficult to raise handle 66 any further, communicating to the operator through his or her tactile sense that indeed the grass level in bag 44a is quite high and that bags 44 are in need of emptying; and (ii) checker 50 slightly compresses the grass in bag 44a and allows the operator to perhaps take one more pass prior to emptying the bags.

It should be noted that a spring could possibly be used to help hold grass checker 50 in its normal vertical position as shown in FIGS. 4 and 5. However, the use of such a spring could make it more difficult for the operator to "feel" the grass within bag 44a. Checker 50 shown in the Drawing relies on gravity alone to keep it in its normal, vertical position unless activated.

It should particularly be noted that the operator can manipulate checker 50 with one hand while keeping his or her remaining hand on the steering wheel, and without taking his or her full attention from the mowing operation.

Another novel feature of grass catcher 13 is the use of a unique pair of latches 70 to connect hood 20 to bag frames 42. Latches 70 are laterally spaced on hood 20 such that latch 70a is aligned with the center of bag frame 42a and latch 70b is aligned with the center of bag frame 42b. An angle iron 71 is fixed to the bottom of inner hood surface 34 by rivets 73, with one portion 75 of angle iron 71 lying adjacent and parallel to vertical surface 34, and one portion 77 of angle iron 71 located immediately below the bottom edge of vertical hood surface 34. Referring to FIG. 7, the underside of angle iron portion 77 engages the top surfaces of bag frames 42 when hood 20 is in its down position; and the portion 75 of angle iron 71 pivotably supports latches 70.

More specifically, each latch 70 includes a narrowed upper end 72 which fits rather loosely into a mating slot formed in portion 75 of angle iron 71. The interconnection between these components allows latches 70 to freely pivot "upwardly" about a pivot axis established at the interface between each latch end 72 and its mating slot. Immediately below each latch upper end 72 is a bag frame gripping portion 74 which is semi-circular in shape and opens forwardly (see FIG. 7) so as to conform to the bag frame 42. The lower end of gripping portion 74 terminates in a downwardly and rearwardly directed latch hand grip 76 which is long enough so as to extend beyond vent 36 and to allow for sufficient leverage to enable its easy manipulation. FIG. 7 shows how one of the latches 70 engages the corresponding bag frame 42. FIG. 8 shows how the latch hand grip 76 is raised to allow the release of bag frame 42 from gripping portion 74. It should be noted that each latch 70 can pivot upwardly only until the top of the hand grip strikes the lowermost edge of hood surface 32 thus preventing the latch 70 from being disengaged with angle iron 71.

FIG. 9 shows the position of one of the latches 70 after hood 20 has been raised a bit and latches 70 have been released and allowed to fall downwardly into their "normal" position. FIG. 9 could represent the status of hood 20 and latches 70 immediately after latches 70 have been released (at the commencement of the raising of hood 20), or toward the end of the hood lowering phase. For purposes of the following discussion, it will be assumed that FIG. 9 represents the latter situation.

FIG. 9 illustrates how each bag frame 42 would engage the underside of the angled portion 76 of the corresponding latch 70. Since the angled portion 76 is pushed upwardly at a point located behind the pivot point of latch 70 in its mating slot, this causes latch 70 to pivot upwardly to the position shown in FIG. 8, thus allowing the curved portion 74 of each latch to receive the corresponding bag frame 42 and allowing the latch 70 to naturally fall into its latched or "normal" position shown in FIG. 7.

Once latches 70 are in their latched (see FIG. 7) positions, they will stay there unless affirmatively pivoted upwardly by the operator. This is because the point of contact between the bottom of frames 42 and curved latch portions 74 is actually located slightly rearward (e.g., right in FIG. 7) of the effective pivot point of latch 70 in angle iron 71. Thus, the pressure of frames 42 against latches 70 tends to draw latches 70 downwardly (clockwise in the Drawing) so that they hold even tighter should hood 20 tend to inadvertently pop open.

As discussed above, latches 70 prevent a gap from developing between hood 20 and bag assemblies 40 so as to prevent the leakage of grass from grass catcher 13. Also, latches 70 prevent hood 20 from inadvertently popping open during use. Both latches 70 have to be manipulated to release hood 20 from bag frames 42 so that hood 20 can be pivoted upwardly as shown in FIG. 3.

There are other modifications which will be apparent to those skilled in the art. Accordingly, the scope of this invention will be limited only by the appended claims.

I claim:

1. A grass checker for determining the level of accumulated grass within a grass catcher, comprising:

(a) a handle portion located outside the grass catcher accessible by an operator;

(b) a grass contacting portion connected to the handle portion and located inside the grass catcher; and (c) means for operatively disposing the grass checker relative to the grass catcher, wherein to check the level of accumulated grass in the grass catcher the operator manipulates the handle portion to move the grass contacting portion toward the accumulated grass, and wherein when the accumulated grass is contacted the operator will encounter increased resistance to movement, whereby the operator can determine based on the position of the handle portion and the degree of increased resistance the level of accumulated grass within the grass catcher.

2. The grass checker of claim 1, wherein:

(a) the grass catcher comprises a bag assembly and a hood; and (b) the disposing means comprises an aperture in the hood which receives the grass checker, with the grass contacting portion being within and beneath the hood and the handle portion being located outside the hood.

3. The grass checker of claim 2, wherein the grass checker is pivotably mounted to the hood.

4. The grass checker of claim 3, wherein the checker has a first unactivated state, wherein the handle is in a lowered position, and a second activated state, wherein the handle is in a raised position relative to its lowered position.

5. The grass checker of claim 4, wherein gravity alone causes the grass checker to normally assume its unactivated state.

6. The grass checker of claim 1, wherein:

(a) the grass catcher comprises first and second bag assemblies and a hood mounted thereupon, the hood forming a grass inlet;

(b) the grass inlet is closer to the first bag assembly than the second bag assembly; and (c) the grass checker is disposed to determine the level of accumulated grass within the first bag assembly.

7. The grass checker of claim 1, wherein the grass catcher comprises a hood and a bag assembly; the grass checker is pivotably secured to the hood, and has a generally vertical unactivated state wherein the handle portion is in a lowered position, and a generally horizontal activated state wherein the handle portion is in a raised position relative to its lowered position; and wherein the balance of the grass checker is such that it assumes its unactivated, generally vertical state when it is not being actively moved from the unactivated state to the activated state to determine the level of accumulated grass within the bag assembly.

8. The grass checker of claim 1, wherein:

(a) the grass catcher comprises first and second bag assemblies and a hood mounted thereupon;

(b) the second bag assembly tends to fill prior to the first bag assembly; and (c) the grass checker is disposed to determine the level of accumulated grass within the first bag assembly.

9. A grass mowing and catching apparatus comprising:

A. a traction vehicle;

B. a rotary mowing deck operatively connected to the traction vehicle, the deck having a discharge chute;

C. a discharge tube extending upwardly from the mowing deck discharge chute, the discharge tube having an upper end;

D. a grass catcher comprising first and second bag assemblies operatively connected to the traction vehicle and a hood disposed above the bag assemblies, wherein the hood comprises a wall which forms an opening receiving the upper end of the discharge tube, wherein the second bag assembly tends to fill at a faster rate than the first bag assembly; and E. a grass checker pivotably connected to the wall of the hood and extending through a grass checker aperture formed thereby, the grass checker being disposed proximate to the first bag assembly and comprising:

(1) a handle portion located outside the hood; and
(2) a grass contacting portion connected to the handle portion and located beneath the hood, wherein:

(a) the grass checker has a first unactivated state wherein the handle is in a lowered position, and a second activated state, wherein the handle is in a raised position relative to its lowered position;

(b) gravity alone causes the grass checker to normally assume its unactivated state; and (c) to check the level of accumulated grass in the first bag assembly the operator manipulates the handle portion of the grass checker to move the grass contacting portion toward the accumulated grass within the first bag assembly, wherein when the accumulated grass is contacted the operator will encounter increased resistance to movement, whereby the operator can determine based on the position of the handle portion and the degree of increased resistance the level of accumulated grass within the first bag assembly.

* * * * *